United States Patent [19]

Quaile

[11] Patent Number: 5,080,521

[45] Date of Patent: Jan. 14, 1992

[54] "O" RING LOCKING MECHANISM

[75] Inventor: William C. Quaile, Collingdale, Pa.

[73] Assignee: Aeroquip Corporation, Jackson, Mich.

[21] Appl. No.: 403,585

[22] Filed: Sep. 1, 1989

Related U.S. Application Data

[63] Continuation of Ser. No. 175,163, Mar. 30, 1988, abandoned.

[51] Int. Cl.⁵ .................................................. B25G 3/18
[52] U.S. Cl. ..................................... 403/326; 285/321; 285/918
[58] Field of Search ......................... 285/918, 305, 321; 403/326

[56] References Cited

U.S. PATENT DOCUMENTS

| | | | |
|---|---|---|---|
| 2,760,831 | 8/1956 | Kirk et al. | 285/321 X |
| 2,812,958 | 11/1957 | Rogers | 285/321 X |
| 3,318,401 | 5/1967 | Carbert | 403/326 X |
| 4,274,663 | 6/1981 | Becker et al. | 285/305 X |
| 4,426,105 | 1/1984 | Plaquin et al. | 285/321 X |

FOREIGN PATENT DOCUMENTS 452682 12/1974 U.S.S.R. .............................. 403/326

Primary Examiner—Andrew V. Kundrat
Attorney, Agent, or Firm—Lipton & Famiglio

[57] ABSTRACT

The present invention is a locking mechanism to prevent relative axial movement of concentric machine parts. In this invention, opposing annular grooves in the concentric members create an annular recess across the interface of the concentric members in which a deformable ring sits. By this configuration, the deformable ring engages the annular grooves in the concentric members and mechanically inhibits the concentric members from relative axial movement.

16 Claims, 2 Drawing Sheets

"O" RING LOCKING MECHANISM

BACKGROUND OF THE INVENTION

This application is a continuation of application Ser. No. 07/175,163 filed March 30, 1988 now abandoned.

This invention relates to locking of concentric machine parts to prevent relative axial movement of the concentric parts.

Machine parts use concentric threading for various purposes. It is usually desirable to maintain the position of such machine parts. The threading may loosen, however, due to vibrations o torque exerted by other machine parts. Locking means are therefore necessary to mechanically block movement caused by vibrations. Such locking means should be economical, easy to manufacture, and easy to disassemble.

Locking wire is widely used to lock concentric members to prevent movement. However, concentric members may need to be taken apart periodically and locking wire may need to be clipped and replaced. Locking wire may also bend and twist during use, which causes difficulty in disassembly.

Deformable rings ar widely used to seal concentric members. Such rings vary in shape to aid in sealing. One common deformable ring is circular in cross-section, and so is called an "O" ring. "O" rings have been used to help seal concentric machine parts. See, for example, patents by Menshen, U.S. Pat. Nos. 4,593,713; Banks, 3,096,096; and Schobbe, 4,498,680. Other rings look like the letter D in cross-section and are known as "D" rings. Still other rings are chevron-shaped in cross-section.

Configurations used with deformable rings also vary to aid in sealing. Some inventors, such as Tobler, U.S. Pat. No. 3,606,358, have added annular shoulders to concentric members to create a recess in which a deformable ring sits. Others have used washers or packing material to define the recess in which the deformable ring sits. Such arrangements are included in patents by Nelson, U.S. Pat. Nos. 3,430,990; Polk, 3,436,085; and Beaudette, 3,371,936. Still others, such as Lissau, U.S. Pat. No. 3,531,132, have placed an annular groove in one of the concentric members to create the recess in which the deformable ring sits. In each of these designs, the deformable ring forms a seal that may make the machine impermeable to fluids.

None of the prior art discussed above uses deformable rings as locking means rather than sealing means. Deformable rings generally retain their shape when outside forces are removed unlike locking wire that deforms from bending and twisting and frequently causes problems during machine maintenance and disassembly. The applicant's invention uses a deformable ring disposed in a recess formed by opposed annular grooves in both concentric members, so that the deformable ring may take the place of locking wire and other locking mechanisms. None of the prior art discloses this design. The applicant's invention also uses grooves in both concentric members to form a teardrop or a bullet cross-sectional shape recess. None of the prior art discloses such a design.

SUMMARY OF THE INVENTION

The present invention uses opposing annular grooves in both concentric members to create a single recess in which a deformable ring sits. These grooves may form in cross-section either a teardrop shape, bullet shape, or other shapes.

Because of its placement across the interface between the concentric members, the deformable ring mechanically blocks movement by either concentric member relative to the other in either direction parallel to the interface. When one concentric member moves axially relative to the other concentric member, the surface of the deformable ring engages the sides of the annular grooves in the concentric members and prevents further movement. The present invention can, therefore, effectively function as a lock without the problems of locking wire.

The shape of the recess in which the deformable ring sits may vary according to convenience of manufacture. In alternative embodiments, the present invention discloses bullet shaped and teardrop-shaped annular recesses. Each of these shapes serves functional purposes. In each, the deformable ring acts as a mechanical barrier and engages the sides of the annular grooves in the concentric members when a force is applied which would move one of the members relative to the other member.

In one preferred embodiment, the invention is used in conjunction with a thread-sealing deformable ring. In this embodiment, one deformable ring acts as a seal to make the overall device impermeable to fluids and the other acts as a lock to prevent movement.

Accordingly, an object of the present invention is to provide locking means for concentric machine parts.

It is a further object of this invention to provide locking means in which a deformable ring is disposed between the interface of concentric members.

It is a further object of this invention to provide locking means for concentric threaded members to prevent movement in conjunction with sealing means to make the overall device impermeable to fluids.

DETAILED DESCRIPTION OF THE DRAWINGS

Figure 1:
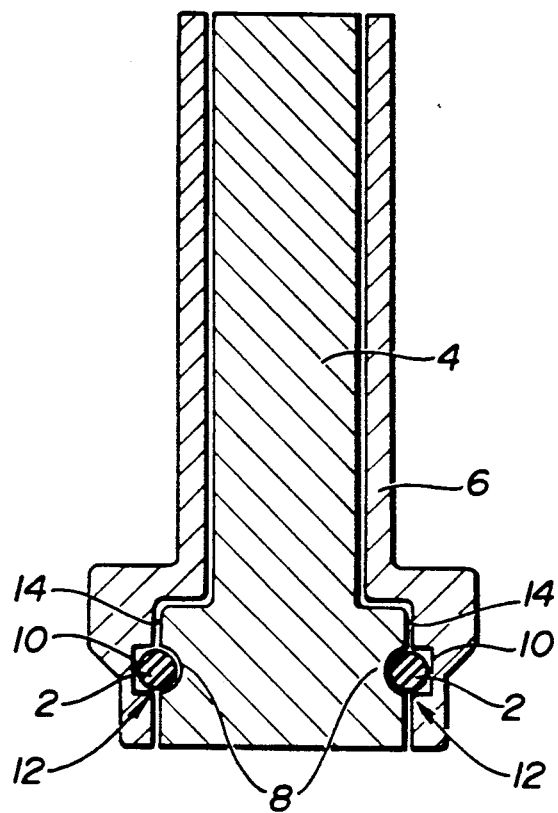
FIG. 1 is a cross-sectional view of the concentric members showing the placement of the deformable ring.

FIG. 1 shows two typical concentric members 4 and 6. The inner surface of concentric member 6 opposes the outer surface of concentric member 4 along interface 14. On the inner surface of concentric member 6 is an annular undercut groove 10 sized to accommodate deformable ring 2. The width of groove 10 should be greater than the width of deformable ring 2 so that ring 2 has space in which to deform to permit assembly of the concentric members. Deformable ring 2 is typically circular in cross-section and is usually referred to as an "O" ring. However, depending upon the shape of the annular grooves, different shape deformable rings may be used. In the outer surface of concentric member 4 is an annular groove 8 with a arcuate or curved cross-section. Curved groove 8 has a radius of curvature equal to or slightly greater than the radius of curvature of deformable ring 2. The cord length of curved groove 8 which defines the width of groove 8 along interface 14 should not be greater than the width of undercut groove 10 in concentric member 6 for optimal locking performance.

As shown in FIG. 1 grooves 8 and 10 are disposed opposite one another so that they form an annular recess 12 in which deformable ring 2 sits. Depending upon the choice of relative depths for grooves 8 and 10, a greater or lesser portion of deformable ring 2 will reside in each concentric member. However, deformable ring 2 should span the entire volume across the interface between the two annular grooves. When there is no force acting upon the concentric members causing axial movement relative to one another, deformable ring 2 sits in the recess 12 as shown in FIG. 1. When an external force causes the two concentric members 4 and 6 to move in opposite directions, the sides of annular grooves 8 and 10 engage deformable ring 2, and deformable ring 2 acts as a mechanical barrier to prevent further displacement of concentric members 4 and 6 relative to each other.

Figure 2:
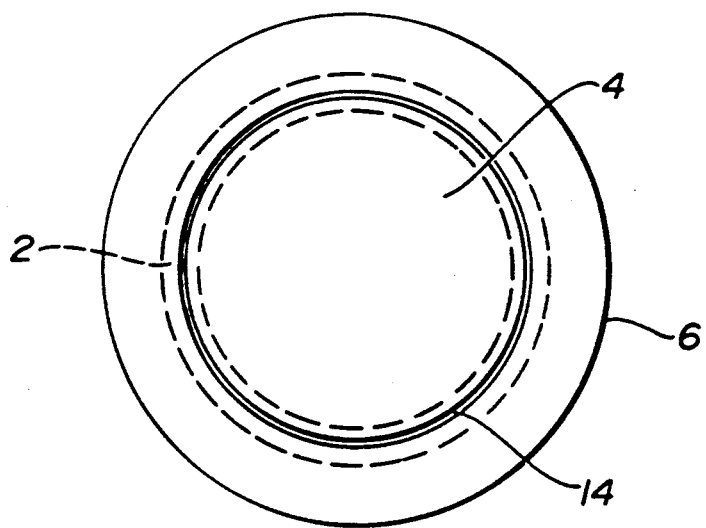
FIG. 2 is a view from the base of the concentric members showing the position of the deformable ring relative to the interface between the concentric members.

FIG. 2 is a view from the base of the concentric members 4 and 6 showing how deformable ring 2 spans the interface 14 between concentric members 4 and 6. While FIG. 2 shows approximately equal thicknesses of deformable ring 2 disposed on either side of interface 14, in practice the relative depths of the annular grooves will determine how much of deformable ring 2 is on each side of interface 14. Because deformable ring 2 sits simultaneously in annular grooves in both concentric members 4 and 6, thereby being disposed across interface 14, the deformable ring 2 is able to mechanically inhibit movement of concentric members 4 and 6 when a force is applied which would cause relative axial movement of the concentric members.

Figure 3:
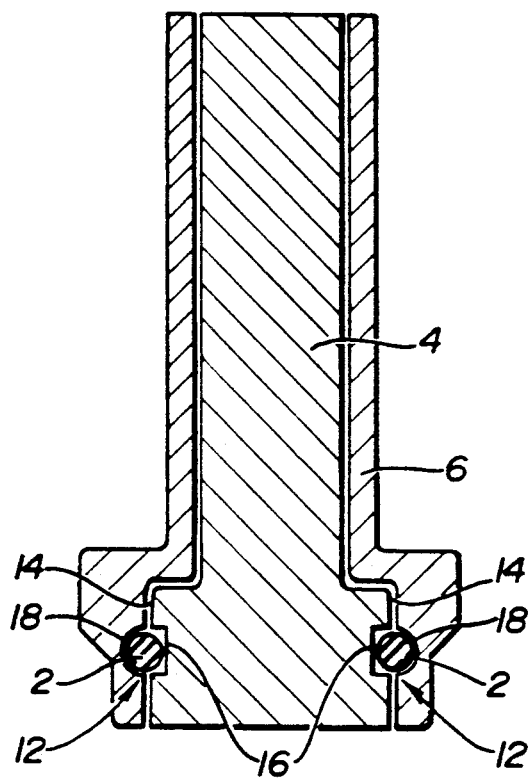
FIG. 3 shows an alternative embodiment in which the annular groove shapes shown in FIG. 1 are switched.

FIG. 3 shows an alternative embodiment in which the shapes of the annular grooves in concentric members 4 and 6 shown in FIG. 1 have been switched between the concentric members. In this alternative embodiment, curved groove 8 of concentric member 4 in FIG. 1 is replaced by the undercut rectangular groove 16 in FIG. 3. The undercut rectangular groove 10 in concentric member 6 in FIG. 1, is replaced by curved groove 18 in FIG. 3. Thus, the cross-sectional groove shapes have simply been switched between concentric members while the shape of annular recess 12 remains the same. The deformable ring 2 acts as a mechanical barrier to relative axial movement of concentric members 4 and 6 just as in the embodiment shown in FIG. 1. Depending on the desired application, however, the overall device may be easier to construct when the alternative embodiment shown in FIG. 3 is used.

Figure 4:
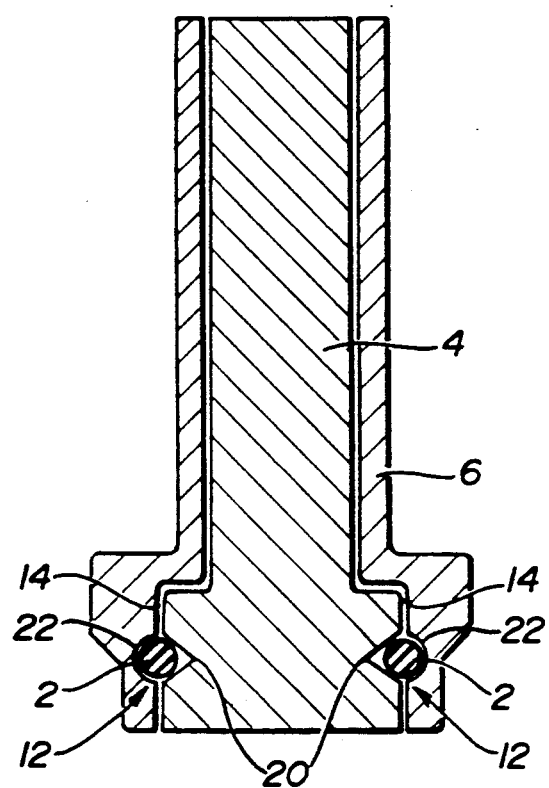
FIG. 4 is a cross-sectional view of the concentric members showing an alternative embodiment having a teardropshaped recess groove.

FIG. 4 is a cross-sectional view of an alternative embodiment in which the annular recess 12 formed by the grooves in concentric members 4 and 6 has a generally teardrop shape formed from a curved and a generally tapered or triangular groove. As shown in FIG. 4, groove 20 in concentric member 4 has a width which diminishes with depth. The angle between the walls of groove 20 is adapted to the size of deformable ring 2 so that deformable ring 2 rests in recess 12 when no force acts to relatively axially displace concentric members 4 and 6. Groove 22 in member 6 is curved. Either one of the grooves may be sized to permit assembly of the concentric members.

When a force is exerted upon concentric member 4 or 6 which would cause relative axial movement of the concentric members, the sides of annular grooves 20 and 22 engage deformable ring 2, and deformable ring 2 acts as a mechanical barrier to prevent further displacement of concentric members 4 and 6 relative to each other.

Figure 5:
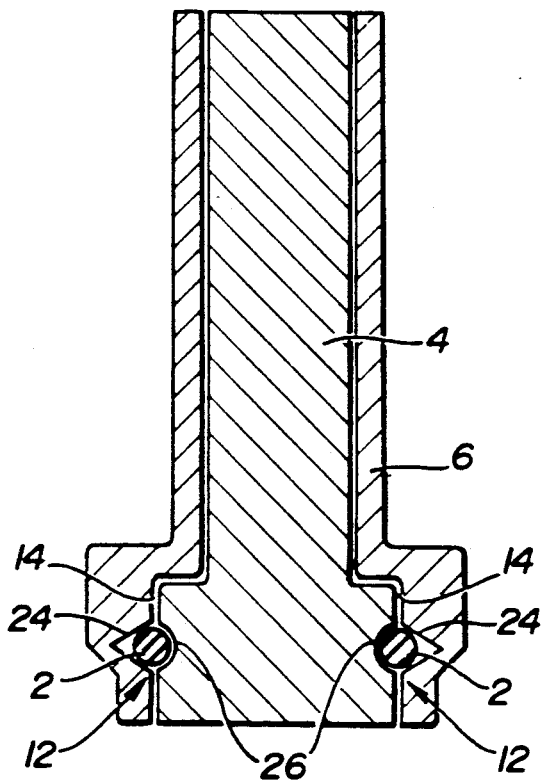
FIG. 5 shows an alternative embodiment in which the groove shapes of FIG. 4 have been switched.

FIG. 5 shows another alternative embodiment in which the annular groove shapes of FIG. 4 are switched between concentric members 4 and 6. Tapered groove 24 is now in member 6 and curved groove 26 is now in member 4. This embodiment functions the same way as does the embodiment shown in FIG. 4.

Figure 6:
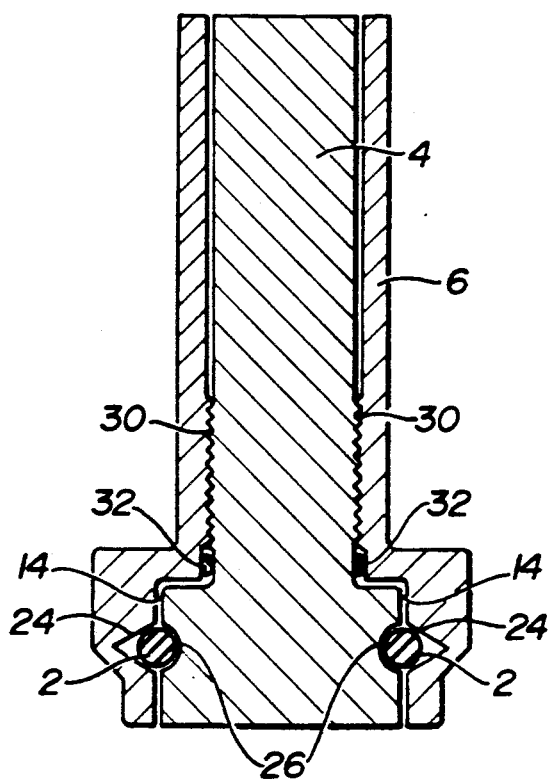
FIG. 6 is a cross-sectional view that shows how the invention is used along with a thread-sealing deformable ring that keeps the locking means free from fluids.

FIG. 6 shows how the invention can be used with concentric threaded members and/or a deformable sealing ring. FIG. 6 is a cross-sectional view showing the threading 30 between concentric members 4 and 6 and a deformable sealing ring 32 at the end of threading 30. Vibration of concentric members 4 and 6 may cause the concentric members to rotate with respect to each other thereby displacing them axially with respect to each other due to the threading. Alternatively, a torque applied to one or the other member would cause the threads to advance the members axially with respect to each other. As shown in the prior embodiments, such axial movement of the concentric members relative to each other will be prevented as the sides of annular grooves 26 and 24 engage deformable ring 2 which acts as a mechanical barrier to further movement of the concentric members. Deformable ring 32 provides a seal between the concentric members 4 and 6 and is not part of the locking mechanism of this invention.

Although the drawings herein show the deformable ring 2 in the base of concentric members 4 and 6, the usefulness of the invention is not limited thereto. The locking mechanism of the present invention may be moved to any plane perpendicular to the length of concentric members 4 and 6.

There are various changes and modifications that may be made to the applicant's invention as would be apparent to those skilled in the art including additional combinations of groove shapes in the inner and outer concentric members such as the use of a rectangular groove with a tapered groove. However, any of these changes or modifications are included in the teaching of the applicant's disclosure, and it is intended that the invention be limited only by the scope of the claims appended hereto.

What is claimed is:

1. A locking mechanism between concentric members threaded along a portion of their interface, which restrains relative axial movement of the members, comprising:
   (a) an annular groove having a substantially rectangular cross-section in the inner concentric member at the interface of said inner ;member with an outer member;
   (b) an annular groove in the outer concentric member at the interface of said outer member with the inner member having a width along the interface not substantially greater than the width along the interface of the annular groove in the inner concentric member, said annular groove being opposite and proximate to the annular groove in the inner concentric member so that said annular grooves define an annular recess; and (c) a deformable ring disposed in said annular recess wherein said rectangular groove has a sufficient width to contain the entire thickness of said deformable ring which is compressed into said groove by the outer concentric member prior to alignment of said grooves in the inner and outer members and wherein once the annular grooves are aligned opposite each other relative axial movement of the concentric members causes the walls of the annular grooves to engage the deformable ring so that the deformable ring acts as a mechanical impediment to prevent further axial displacement of the concentric members relative to each other.

2. The locking mechanism of claim 1 in which the deformable ring is an "O" ring.

3. A locking mechanism between concentric members threaded along a portion of their interface, which restrains relative axial movement of the members, comprising:

(a) an annular groove having a substantially rectangular cross-section in the inner concentric member at the interface of said inner member with an outer member;

(b) an annular having an arcuate cross-section in the outer concentric member at the interface of said outer member with the inner member having a width along the interface not substantially greater than the width along the interface of the annular groove in the inner concentric ;member, said annular groove being opposite and proximate to the annular groove in the inner concentric member so that said annular grooves define an annular recess; and (c) a deformable ring disposed in said annular recess wherein relative axial movement of the concentric members causes the walls of the annular grooves to engage the deformable ring so that the deformable ring acts as a mechanical impediment to prevent further axial displacement of the concentric members relative to each other.

4. The locking mechanism of claim 3 in which the deformable ring is an "O" ring.

5. A locking mechanism between concentric members threaded along a portion of their interface, which restrains relative axial movement of the members, comprising:

(a) an annular groove having a substantially rectangular cross-section in the inner concentric member at the interface of said inner member with an outer member;

(b) an annular groove having a width which decreases substantially linearly with distance from the interface between the concentric members in the outer concentric member at the interface of said outer member with the inner member having a width along the interface not substantially greater than the width along the interface of the annular groove in the inner concentric member, said annular groove being opposite and proximate to the annular groove in the inner concentric member so that said annular grooves define an annular recess; and (c) a deformable ring disposed in said annular recess wherein relative axial movement of the concentric members causes the walls of the annular grooves to engage the deformable ring so that the deformable ring acts as a mechanical impediment to prevent further axial displacement of the concentric members relative to each other.

6. The locking mechanism of claim 5 in which the deformable ring is an "O" ring.

7. A locking mechanism between concentric members threaded along a portion of their interface, which restrains relative axial movement of the members, comprising:

(a) an annular groove in the inner concentric member at the interface of said inner member with an outer member;

(b) an annular groove in the outer concentric member at the interface of said outer member with the inner member having a width along the interface not substantially greater than the width along the interface of the annular groove in the inner concentric member, said annular groove being opposite and proximate to the annular groove in the inner concentric member so that said annular grooves define an annular recess; and (c) a deformable "O" ring disposed in said annular recess wherein relative axial movement of the concentric members causes the walls of the annular grooves to engage the deformable "O" ring so that the deformable "O" ring acts as a mechanical impediment to prevent further axial displacement of the concentric members relative to each other.

8. A locking mechanism between concentric members threaded along a portion of their interface, which restrains relative axial movement of the members, comprising:

(a) an annular groove having a substantially rectangular cross-section in the outer concentric member at the interface of said outer member with an inner member;

(b) an annular groove in the inner concentric member at the interface of said inner member with the outer member having a width along the interface not substantially greater than the width along the interface of the annular groove in the outer concentric member, said annular groove being opposite and proximate to the annular groove in the outer concentric member so that said annular grooves define an annular recess; and (c) a deformable ring disposed in said annular recess wherein said rectangular groove has a sufficient width to contain the entire thickness of said deformable ring which is compressed into said groove by the inner concentric member prior to alignment of said grooves in the inner and outer members and wherein once the annular grooves are aligned opposite each other relative axial movement of the concentric members causes the walls of the annular grooves to engage the deformable ring so that the deformable ring acts as a mechanical impediment to prevent further axial displacement of the concentric members relative to each other.

9. The locking mechanism of claim 8 in which the deformable ring is an "O" ring.

10. A locking mechanism between concentric members threaded along a portion of their interface, which restrains relative axial movement of the members, comprising:

(a) an annular groove having a substantially rectangular cross-section in the outer concentric member at the interface of said outer member with an inner member;

(b) an annular groove having an arcuate cross-section in the inner concentric member at the interface of said inner member with the outer member having a width along the interface not substantially greater than the width along the interface of the annular groove in the outer concentric member, said annular groove being opposite and proximate to the annular groove in the outer concentric member so that said annular grooves define an annular recess; and (c) a deformable ring disposed in said annular recess wherein relative axial movement of the concentric members causes the walls of the annular grooves to engage the deformable ring so that the deformable ring acts as a mechanical impediment to prevent further axial displacement of the concentric members relative to each other.

11. The looking mechanism of claim 10 in which the deformable ring is an "O" ring.

12. A locking mechanism between concentric members threaded along a portion of their interface, comprising:

(a) an annular groove having a substantially rectangular cross-section in the outer concentric member at the interface of said outer member with an inner member;

(b) an annular groove having a width which decreases substantially linearly with distance from the interface between the concentric members in the inner concentric member at the interface of said inner member with the outer member having a width along the interface not substantially greater than the width along the interface of the annular groove in the outer concentric member, said annular groove being opposite and proximate to the annular groove in the outer concentric member so that said annular grooves define an annular recess; and (c) a deformable ring disposed in said annular recess wherein relative axial movement of the concentric members causes the walls of the annular grooves to engage the deformable ring so that the deformable ring acts as a mechanical impediment to prevent further axial displacement of the concentric members relative to each other.

13. The locking mechanism of claim 12 in which the deformable ring is an "O" ring.

14. A locking mechanism between concentric members threaded along a portion of their interface, which restrains relative axial movement of the members, comprising:

(a) an annular groove in the outer concentric member at the interface of said outer member with an inner member;

(b) an annular groove in the inner concentric member at the interface of said inner member with the outer member having a width along the interface not substantially greater than the width along the interface of the annular groove in the outer concentric member, said annular groove being opposite and proximate to the annular groove in the outer concentric member so that said annular grooves define an annular recess; and (c) a deformable "O" ring disposed in said annular recess wherein relative axial movement of the concentric members causes the walls of the annular grooves to engage the deformable "O" ring so that the deformable "O" ring acts as a mechanical impediment to prevent further axial displacement of the concentric members relative to each other.

15. A locking mechanism between concentric members threaded along a portion of their interface, which restrains relative axial movement of the members, comprising:

(a) an annular groove in the inner concentric member at the interface of said inner member with an outer member;

(b) an annular groove in the outer concentric member at the interface of said outer member with the inner member wherein:

(i) the annular groove in the inner concentric member is opposite and proximate to the annular groove in the outer concentric member so that the two grooves define an annular recess; and (ii) the annular recess defined by the annular grooves is substantially tear dropped shaped in cross section; and (c) a deformable ring disposed in said annular recess wherein relative axial movement of the concentric members causes the walls of the annular grooves to engage the deformable ring so that the deformable ring acts as a mechanical impediment to prevent further axial displacement of the concentric members relative to each other.

16. The looking mechanism of claim 15 in which the deformable ring is an "O" ring.

* * * * *

UNITED STATES PATENT AND TRADEMARK OFFICE
CERTIFICATE OF CORRECTION

PATENT NO. : 5,080,521
DATED : 01/14/92
INVENTOR(S) : William C. Quaile

It is certified that error appears in the above-identified patent and that said Letters Patent is hereby corrected as shown below:

Column 1, line 24, after the word "rings" the word should be "are".

Column 4, line 61, remove the semicolon found after the word "inner"

Column 5, line 27, after the word "annular" insert the word "groove"

Column 5, line 32, remove the semicolon found after the word "concentric"

Column 7, line 23, after the word "interface," the following text should be added: "which restrains relative axial movement of the members"

Signed and Sealed this

Twelfth Day of October, 1993

*Attest:*

BRUCE LEHMAN

*Attesting Officer*     *Commissioner of Patents and Trademarks*